Patented Aug. 27, 1935

2,012,307

UNITED STATES PATENT OFFICE 2,012,307

PRODUCTION OF NITRO-ARYLAMINES

Lawrence H. Flett, Hamburg, N. Y., assignor to National Aniline & Chemical Company, Inc., New York, N. Y., a corporation of New York No Drawing. Application July 5, 1932, Serial No. 620,971

22 Claims. (Cl. 260—130.5)

This invention relates to the production of nitro-arylamines. It relates more particularly to the production of nitro-arylamines by a process in which an acylarylid (a carboxylic acid amide of an arylamine) is nitrated to produce the corresponding nitro-acylarylid, and the nitro-acylarylid is treated to convert it to the corresponding nitro-arylamine. The invention includes improvements in the method of producing the nitro-arylamines, and improvements in the method of obtaining a nitro-arylamine from a mixture of nitro-arylamines.

The nitro-arylamines, which are a well known class of organic chemical compounds, find extensive use as intermediates for various chemical processes and products. Thus p-nitraniline (a p-nitro derivative of aniline) is extensively used as an intermediate in the manufacture of dye-stuffs. Owing to the difficulty of obtaining satisfactory yields of p-nitraniline free from undesirable by-products by the direct nitration of aniline, it has been manufactured on a large scale by the controlled nitration of acetanilid and hydrolysis of the resulting nitro-acetanilid. During the course of the nitration o-nitro-acetanilid is also produced in considerable amounts, particularly when a low nitration reaction temperature is not maintained, as well as other by-products, and as a result of the hydrolysis o-nitraniline is also obtained. But the resulting o-nitraniline and other by-products are usually undesired in the p-nitraniline product, particularly when it is to be used for the making of azo dyes; various methods therefore have been employed to eliminate them during the course of manufacture of the p-nitraniline.

One method generally employed in practice for the elimination of o-nitraniline involves a two-step hydrolysis of the mixture of nitro-acetanilids, resulting from the nitration of acetanilid, which depends upon the difference in relative stability of ortho- and para-nitro-acetanilids with respect to certain hydrolyzing agents. Thus, the mixture of nitro-acetanilids (obtained by subjecting acetanilid to the action of a mixture of nitric and sulfuric acids, mixing the reaction mixture with iced water, filtering off the precipitated mixed nitro-acetanilids, and washing to remove residual acid) is heated with dilute sodium carbonate solution to convert the o-nitro-acetanilid to o-nitraniline, which dissolves in the weakly alkaline liquor; the unhydrolyzed p-nitro-acetanilid is then separated by filtration from the alkaline solution of o-nitraniline; the separated p-nitro-acetanilid is then separately hydrolyzed by boiling with dilute sodium hydroxide solution; and the resulting p-nitraniline is separated from the alkaline solution by filtration, washed and dried. This procedure is not wholly satisfactory, however, since it results in a loss in yield of p-nitraniline due to hydrolysis of some of the p-nitro-acetanilid, during the hydrolysis of the o-nitro-acetanilid, and elimination of the resulting p-nitraniline with the o-nitraniline; furthermore the cost of the resulting p-nitraniline is increased by the expense involved in isolating the nitro-acetanilids from the nitration reaction mixture and in separately hydrolyzing the ortho- and para-nitro-acetanilids; and, in addition, the resulting p-nitraniline is contaminated with by-products which are not eliminated by the process.

An object of the present invention is to provide a simple, direct and efficient process for the production of nitro-arylamines, particularly mono-nitro-arylamines, from acylarylids which can be carried out with a saving of materials, with less equipment, and in a shorter period of time than processes heretofore practiced.

Another object of the present invention is to provide a process for the production of p-nitraniline of a high degree of purity from a mixture containing it and an isomeric nitraniline, particularly a mixture containing o- and p-nitranilines, by a process which is simple to perform and efficient in operation.

Additional objects of the present invention are to provide a simple and efficient process for the production of p-nitraniline of a high degree of purity from a mixture of nitranilines resulting from the nitration of an acylanilid, especially acetanilid, and de-acylation of the resulting nitro-acylanilids; and to provide a process for the production of p-nitraniline of a high degree of purity from acylanilids, especially acetanilid, by nitration and de-acylation of the resulting nitro-acylanilids without isolation thereof from the nitration reaction mixture.

A further object of the present invention is to produce p-nitraniline sulfate of a high degree of purity from a mixture of nitranilines.

Other objects of the invention will in part be obvious and will in part appear hereinafter.

According to the present invention an acylarylid may be nitrated in the presence of an acid to produce a nitro-acylarylid, and the resulting nitro-acylarylids may be directly converted to the corresponding nitro-arylamine by heating the nitration reaction mixture without isolation of the nitro-acylarylids therefrom. The nitro-arylamine then may be separated from the resulting reaction mixture in the form of a salt of an acid in which other reaction products are more soluble. If desired, the separated nitroarylamine salt may be employed as such, or it may be then converted to the free nitro-arylamine.

The invention accordingly comprises the several steps and the relation of one or more of said steps with others thereof which will be exemplified in the process hereinafter disclosed. The scope of the invention is indicated in the appended patent claims.

One feature of the present invention resides in the direct hydrolysis of a nitro-acylarylid without isolation from the nitration reaction mixture in which it has been produced. I have found, in the nitration of an acylarylid in the presence of an acid, that it is not necessary to isolate the resulting nitro-acylarylid before subjecting it to hydrolysis, but that the hydrolysis may be brought about in the same reaction mixture in which the nitration has taken place and by means of the spent acid remaining in the nitration reaction mixture. Thus, when acetanilid is nitrated in the presence of sulfuric acid, it is not necessary to separate the resulting nitro-acetanilids from the nitration reaction mixture, but removal of the acetyl radical by hydrolysis can be accomplished by heating the nitration reaction mixture without isolation of the nitro-acetanilids therefrom. While this hydrolysis may be accomplished with acids of various kinds and of various strengths and at various temperatures, I have found that the process operates with greater facility, and the purity and yield of the resulting p-nitraniline is greater, when sulfuric acid is used having a concentration which lies within the range of about 55 per cent. to about 75 per cent., more particularly 60 to 70 per cent. and especially about 65 per cent. sulfuric acid, and the temperature employed is about 60° C. to 80° C.

Another feature of the present invention resides in the discovery of a simple and efficient method for the separation of nitro-derivatives of certain primary arylamines by means of an acid or mixture of acids. I have found that certain nitro primary arylamines (as for example, nitro primary arylamines of the benzene series which are free from sulfo and carboxyl groups) and/or their salts with many acids or a mixture of acids do not have the same solubility in the said acids, and accordingly the base or a salt or salts of one of said nitro-arylamines with an acid or mixture of acids may be separated from a solution of another nitro-arylamine or salt in the acid or mixture of acids. By proper choice of acids and conditions, such as concentration and temperature, various nitro-arylamines may be separated from each other and from mixtures containing them. Thus, I have found that sulfuric acid, particularly of a strength of about 55 to about 75 per cent., and especially of about 60 per cent., provides an excellent medium for the separation of p-nitraniline from other nitranilines, and especially from o-nitraniline, particularly at temperatures below 60° C.

Another feature of the present invention lies in the utilization of the above discoveries as a basis for a highly efficient, simple and direct process for the production of nitro primary arylamines from acylarylids, particularly of the benzene series. Thus, in accordance with the present invention, an N-acyl derivative of a primary arylamine of the benzene series which does not contain a sulfo or carboxyl group may be nitrated in the presence of an acid, as for example sulfuric acid, the mixture of isomeric nitro-acylarylids produced by the nitration then may be directly hydrolyzed to the corresponding nitro-arylamines, without isolation from the resulting reaction mixture, merely by heating the reaction mixture (after adjusting the acid concentration to the optimum value, if necessary or desired), and one or more of the resulting isomeric nitro-arylamines may be directly separated as the base or as the insoluble salt, e. g. sulfate, from the remaining reaction mass (containing, for example, the other nitro compounds and by-products in solution), as by cooling the resulting reaction mass, with or without adjustment of the acid concentration of the mass.

It is a further feature of the present invention that the above discoveries, relating to the action of sulfuric acid of about 55 to 75 per cent. strength as a hydrolyzing agent for nitro-acylanilids and as an agent for the separation of p-nitraniline from o-nitraniline, provide a highly efficient, simple and direct method for producing a p-nitraniline which is substantially free from o-nitraniline from a mixture of p- and o-nitro-acylanilids, and particularly from a mixture containing a relatively small proportion of o-nitro-acylanilid. Thus, by heating a mixture of nitro-acylanilids containing a major proportion of the para-isomer with sulfuric acid of about 55 to about 75 per cent. concentration until hydrolysis has been produced, then merely cooling the resulting reaction mixture (for example, to normal room temperature) and separating the resulting precipitate from the remaining solution, p-nitraniline sulfate may be obtained substantially free from o-nitraniline and its sulfates.

In order that the invention may be more fully comprehended, it will be hereinafter described in connection with the production of p-nitraniline from acetanilid. It should be understood, however, that the invention is not limited thereto but may be employed in the production of other nitro-acylarylids, or for obtaining one or more nitro-arylamines from mixtures of nitro-arylamines.

Acetanilid may be nitrated with a mixture of nitric and sulfuric acids to produce a reaction mixture containing p-nitro-acetanilid and other isomeric nitro-acetanilids as well as residual sulfuric acid, preferably while maintaining a low temperature so as to reduce the proportion of o-nitro-acetanilid produced. The resulting reaction mixture, without removal of the nitro-acetanilids therefrom, after dilution with water or less concentrated sulfuric acid, if necessary or desirable, then may be heated to convert the nitro-acetanilids to the corresponding nitranilines, the resulting mass containing the isomeric nitranilines and sulfuric acid then may be cooled, after adjusting the sulfuric acid acidity of the mixture, if necessary or desirable, to precipitate p-nitraniline sulfate (the sulfuric acid salt of p-nitraniline) while maintaining the other nitranilines present in solution, and the precipitated p-nitraniline sulfate may then be separated from the remaining solution in any suitable manner, as by filtration, centrifugation, etc.

There is thus produced p-nitraniline sulfate relatively free from other nitro-aniline compounds. It may be directly employed as an intermediate for the production of other chemical compounds; as for example, for the production of azo dyes by diazotization of the p-nitraniline sulfate and coupling with a suitable coupling component. If it is desired, however, to produce p-nitraniline, this may be readily done by converting the p-nitraniline sulfate to the free amine by any suitable method; as for example, by treatment with water, alkali, etc.

The o-nitraniline and any dinitranilines present in the remaining solution, from which the p-nitraniline sulfate has been separated, may also be separated if desired by diluting the remaining solution with water to precipitate the dinitraniline (free base), which may be separated from the solution, then further diluting and/or partially neutralizing the excess acid, to precipitate o-nitraniline (free base), which may also be separated, and finally completely neutralizing the solution to precipitate as the base any residual p-nitraniline present.

The following examples are presented for the purpose of illustrating a manner in which the invention may be practiced. The parts are by weight:

*Example 1.*—875 parts of commercial acetanilid, 93 per cent. purity, are dissolved in 2400 parts of 100 per cent. sulfuric acid at a temperature below 25° C. To the resulting solution, there is added 816 parts mixed acid (containing 46 per cent. nitric acid, 48 per cent. sulfuric acid and 6 per cent. water), the temperature of the reaction mixture being maintained at 2° C. When the nitration is complete, there is added 1330 parts of cold water (5° to 25° C.) to the well-stirred reaction mass, and the temperature of the mixture is adjusted to, and maintained at, about 70° C. for 4 to 5 hours, or until the acetyl group is removed by saponification. (The strength of the sulfuric acid in the mixture is about 65 per cent.) The saponification is substantially complete when a drop or so of the liquor added to 10 cc. of dilute hydrochloric acid (sp. gr. 1.05) gives a clear solution at room temperature. When the saponification is substantially complete, the reaction mass is cooled to 0° C., and the p-nitraniline sulfate, which has separated out, is filtered off, as by a centrifuge. (The strength of the sulfuric acid in the mixture is about 65 per cent.) The amount of p-nitraniline sulfate thus obtained corresponds to about 675 parts of p-nitraniline. It is obtained in the form of needles which are white to light brown in color. It may be used as such, for example for conversion to the corresponding diazo body. It may also be converted into the free base in any suitable manner; for example, by slurrying it with 5000 parts of water containing 680 parts of sodium carbonate, filtering off the free base at about 30° C., and washing the precipitate with water until free from sodium sulfate.

In the above example the acetanilid employed may be made in any suitable way, and may be added in the molten state to the cold sulfuric acid if desired. An acetanilid containing acetic acid remaining from the acetylation of aniline may also be employed if desired.

The temperature at which the nitration may be carried out may vary considerably, depending upon the product desired. When p-nitraniline is the desired product, the temperature should be maintained as low as consistent with economical operation, inasmuch as the proportion of o-nitro compound produced increases with an increase in temperature. Temperatures as high as 30° C. may be employed, but temperatures not exceeding 10° C. are preferred, as with temperatures higher than 10° C. the resulting p-nitraniline sulfate may be contaminated and the yield may be reduced.

The amount of sulfuric acid employed in the nitration may vary considerably; thus from 1.5 to 4.5 parts of concentrated sulfuric acid (93 to 100 per cent. sulfuric acid) may be employed per part of acetanilid without adversely influencing the process. Proportions of about 3 parts of 100 per cent. sulfuric acid per part of acetanilid are preferably employed.

The mixed acid employed may be of any suitable strength, the amount preferably employed being such that it corresponds with a ratio of one mol of nitric acid per mol of acetanilid. A lower proportion of nitric acid may be employed, but a maximum yield of p-nitraniline will not then be obtained; and a greater proportion of nitric acid may also be employed, but this will also reduce the yield of p-nitraniline and increase the yield of dinitroanilines.

The hydrolysis of the nitro-acetanilid mixture is advantageously carried out with 55 per cent. to 75 per cent. sulfuric acid (neglecting any acetic acid present) more particularly 60 per cent. to 70 per cent. sulfuric acid and preferably about 65 per cent. sulfuric acid. The hydrolysis with 60 per cent. to 70 per cent. sulfuric acid is preferably carried out at a temperature of about 70° C. Other temperatures, e. g., 50° to 100° C., may be employed, however, particularly with a more dilute or more concentrated acid.

The temperature to which the sulfuric acid solution of the nitranilines is cooled may vary. Ordinarily it is desirable to cool the solution to or below 0° C. in order to obtain maximum yields.

*Example 2.*—110 parts of acetanilid are charged slowly into 425 parts of 66° Bé. sulfuric acid with constant stirring, and 118 parts of mixed nitrating acid containing 29 per cent. nitric acid and 57 per cent. sulfuric acid are introduced. 110 parts more of acetanilid are then added, followed by the addition of 236 parts of mixed nitrating acid of the same composition as that previously used. During the addition of the charge and during the nitration, the temperature is maintained between 25° to 30° C. When the additions are complete the nitroacetanilid should be in solution. Following nitration, the mass, in order to remove the acetyl group, is heated to 90° to 115° C. for a period of several hours, or until a test portion of 15 drops in 5 cc. of water gives a clear diazo solution when sodium nitrite is added. If a curdy precipitate appears in this test, it indicates that saponification of the acetyl group and its replacement by hydrogen is not completed, in which case heating is continued a while longer. When the saponification is complete, the solution is cooled, water is added with cooling to decrease the concentration to about 65 per cent. (210 parts of water) and the solution is cooled to about 0° C., whereby p-nitraniline sulfate is precipitated. The precipitate of p-nitraniline sulfate is filtered off.

*Example 3.*—A mixture of o- and p-nitranilines (such as is obtained by nitrating acetanilid, separating the resulting mixed nitro-acetanilids from the reaction mixture, and heating the mixed nitro-acetanilids with caustic alkali solution, in accordance with the process known to the art) is dissolved in 10 parts of 60 to 70 per cent. sulfuric acid at about 70° C., the solution is cooled to about 0° C., and the resulting insoluble p-nitraniline sulfate is separated from the remaining solution on a centrifuge. The o-nitraniline is then recovered from the mother liquors by diluting with water and/or partially neutralizing the excess acid present with alkali, and filtering off the precipitate.

Instead of dissolving the mixture of p-nitraniline and o-nitraniline, which may also contain some m-nitraniline, in the sulfuric acid, the mixture may be extracted with 2.4 parts of sulfuric acid at a temperature of about 15° C., whereby o-nitraniline and m-nitraniline, if present, are obtained as a solution in the sulfuric acid while p-nitranline remains as the insoluble sulfate.

It will be realized that the invention is not limited to the details of the above examples, but that various changes may be made in the materials treated, method of procedure, reagents employed, and other conditions without departing from the scope of the appended patent claims.

Thus, in place of the acetanilid employed in the above examples, other acylanilids may be used; as for example formanilid, oxanilid, homologues thereof, alkyl ethers of said anilids and their homologues, etc.

It will also be evident that the advantages of any one or more of the individual improvements forming features of the invention, and included in the combined process, may be separately secured, if desired, by employing any one or more of the improved steps of the combined process with intermediates produced in other ways, and by subjecting the resulting products to other treatments, than those above described. For securing the maximum benefit of the invention, however, the combined process is preferably carried out in its entirety.

Furthermore, it is not essential to employ a strength of acid for one step of the combined process which it is desirable to employ in a subsequent step thereof, but other strengths of acid may be employed, and the concentration thereof then adjusted by addition of more concentrated or more dilute acid or water, as the case may be. By employing, however, in an earlier step of the complete process, an acid of a concentration required for a subsequent step of the process, greater simplification of the process may be obtained, with its resultant economies in operation.

This application is a continuation-in-part of my copending application for "Production of diazo-nitroaryl compounds", Serial No. 388,268, filed August 24, 1929, issued as United States Patent No. 1,870,842.

I claim:

1. A method of producing a nitro-aniline which comprises nitrating an acylanilid to form a reaction mixture containing a plurality of isomeric nitro-acylanilids, heating the resulting mixture of nitro-acylanilids with sulfuric acid, without isolation from said reaction mixture, to produce a mixture of the corresponding isomeric nitro-anilines, separating one of said nitro-anilines in the form of a sulfate from the remaining reaction mass containing another of said nitro-anilines, and converting the separated nitro-aniline sulfate to the nitro-aniline.

2. A method of producing a nitro-aniline which comprises nitrating an acylanilid in the presence of sulfuric acid to produce a reaction mixture containing a corresponding nitro-acylanilid, heating the resulting nitro-acylanilid with sulfuric acid while still contained in said reaction mixture to produce the nitro-aniline, and separating the nitro-aniline in the form of a sulfate from the remaining reaction mixture.

3. A method of producing p-nitraniline which comprises nitrating an acyl derivative of aniline in the presence of sulfuric acid to form a reaction mixture containing nitro-acylanilids, heating a resulting nitro-acylanilid with sulfuric acid, without isolation from said reaction mixture, to produce the corresponding nitraniline, and separating the nitraniline in the form of a sulfate from the remaining reaction mass.

4. A method of producing p-nitraniline which comprises nitrating an acyl derivative of aniline in a reaction mixture containing sulfuric acid in excess of 75 per cent. strength to produce the corresponding p-nitro-acylanilid and o-nitro-acylanilid, adjusting the sulfuric acid acidity of the resulting reaction mixture to a value within the range of about 55 to about 75 per cent. sulfuric acid, heating the resulting mixture to produce p-nitraniline and o-nitraniline, precipitating p-nitraniline in the form of a sulfate from the resulting reaction mass while maintaining o-nitraniline in solution, and separating the precipitated p-nitraniline sulfate from the remaining solution.

5. A method of producng p-nitraniline which comprises nitrating acetanilid in a reaction mixture containing sulfuric acid in excess of 75 per cent. strength to product p-nitro-acetanilid and o-nitro-acetanilid, adjusting the sulfuric acid acidity of the resulting reaction mixture to a value within the range of about 60 to about 70 per cent. sulfuric acid, heating the resulting mixture at a temperature of about 60° to about 80° C. to produce p-nitraniline and o-nitraniline in solution, cooling the resulting reaction mass to precipitate p-nitraniline in the form of a sulfate while maintaining o-nitraniline in solution, and separating the precipitated p-nitraniline sulfate from the remaining solution.

6. A method of producing p-nitraniline which comprises nitrating acetanilid in a reaction mixture containing sufficient sulfuric acid to provide a sulfuric acid, at the completion of the nitration, of at least 60 per cent. strength, whereby nitro-acetanilid is produced, heating the resulting reaction mixture without isolating the nitro-acetanilid to produce p-nitraniline, cooling the resulting reaction mass to precipitate p-nitraniline sulfate, and separating the precipitated p-nitraniline sulfate from the remaining reaction mass.

7. A method of producing p-nitraniline which comprises nitrating acetanilid dissolved in concentrated sulfuric acid with mixed nitrating acid while maintaining the reaction mixture between 0° and 10° C., diluting the reaction mixture with water, heating the resulting mixture at a temperature not exceeding about 70° C. until saponification is substantially complete, the amount of water employed for dilution being adapted to produce a sulfuric acidity, at the completion of the saponification operation, of about 65 per cent., cooling the resulting mass below normal room temperature, whereby p-nitraniline sulfate is precipitated, and separating the precipitated p-nitraniline sulfate from the remaining reaction mass.

8. A process of producing p-nitraniline which comprises nitrating commercial acetanilid in the form of a solution of 1 part of acetanilid in 1.5 to 4.5 parts of 100 per cent. sulfuric acid with about 1 part of mixed nitrating acid containing 46 per cent. of nitric acid while maintaining the temperature between 0° and 5° C., adding about 1.5 parts of cold water to the resulting nitration reaction mixture, heating the resulting mixture at a temperature of about 70° C. until saponification is substantially complete, cooling the resulting reaction mass to about 0° C. to precipitate p-nitraniline sulfate, and separating the precipitated p-nitraniline sulfate from the remaining solution.

9. A method of producing a nitro-aniline which comprises nitrating an acylanilid in a nitrating medium containing sulfuric acid to form a reaction mixture containing the corresponding nitro-acylanilid, and heating the resulting nitro-acylanilid with sulfuric acid, while still contained in the reaction mixture, to produce the corresponding nitro-aniline.

10. A method of producing a nitro-aniline which comprises nitrating an acylanilid in the presence of sulfuric acid to form a reaction mixture containing the corresponding nitro-acylanilid, and heating the nitro-acylanilid, while still contained in the reaction mixture, with sulfuric acid of about 60 to about 70 per cent strength, to produce the corresponding nitro-aniline.

11. A method of producing a nitro-aniline which comprises nitrating an acylanilid in the presence of concentrated sulfuric acid to produce a reaction mixture containing the corresponding nitro-acylanilid, adjusting the sulfuric acid acidity of the resulting reaction mixture to a value within the range of about 55 to about 75 per cent. sulfuric acid, without isolation of the nitro-acylanilid, and heating the resulting mixture to produce the corresponding nitro-aniline.

12. A method of producing a nitraniline which comprises nitrating an acyl derivative of aniline in the presence of sufficient sulfuric acid to produce a mixture comprising the corresponding nitro-acylanilid and sulfuric acid, and then heating the reaction mixture, without isolating the nitro-acylanilid, to produce the nitraniline.

13. A method of producing a nitraniline which comprises nitrating an acyl derivative of aniline in the presence of concentrated sulfuric acid to produce a reaction mixture containing the corresponding nitro-acylanilid, adjusting the sulfuric acid acidity of the resulting reaction mixture to a value within the range of about 55 to about 75 per cent. sulfuric acid, without isolation of the nitro-acylanilid, and heating the resulting mixture at a temperature of about 50° to about 100° C. to produce the nitraniline.

14. A method of producing p-nitraniline which comprises nitrating acetanilid in a reaction mixture containing sufficient sulfuric acid to provide a sulfuric acid, at the completion of the nitration, of a concentration not less than 55 per cent., whereby nitro-acetanilid is produced, and heating the resulting reaction mixture, without separating the nitro-acetanilid therefrom, to produce p-nitraniline.

15. A method of producing p-nitraniline which comprises heating with sulfuric acid a p-nitro-acyl derivative of aniline containing an o-nitro-acyl derivative of aniline in admixture therewith to produce a solution of p-nitraniline and o-nitraniline in the sulfuric acid, and separating p-nitraniline in the form of a sulfate from the resulting solution while maintaining the o-nitraniline in solution.

16. A method of producing p-nitraniline which comprises heating a p-nitro-acylanilid containing a minor proportion of an o-nitro-acylanilid in admixture therewith with sulfuric acid of about 55 per cent. to about 75 per cent. strength to produce p-nitraniline, and adjusting the sulfuric acid acidity and the temperature of the resulting reaction mixture to values within the ranges of about 55 per cent. to about 75 per cent. sulfuric acid and about 60° C. to about 0° C. to precipitate p-nitraniline sulfate, and separating precipitated p-nitraniline sulfate from the remaining solution.

17. A method of producing p-nitraniline which comprises heating p-nitro-acetanilid containing o-nitro-acetanilid in admixture therewith with sulfuric acid of about 55 per cent. to about 75 per cent. strength to produce a solution of p-nitraniline and o-nitraniline in the sulfuric acid, cooling the solution to precipitate p-nitraniline sulfate while retaining o-nitraniline in solution, and separating precipitated p-nitraniline sulfate from the remaining solution.

18. A method of producing p-nitraniline which comprises heating p-nitro-acetanilid containing o-nitro-acetanilid in admixture therewith with sulfuric acid of about 65 per cent. strength at a temperature of about 70° C. until saponification is substantially complete, cooling the resulting reaction mixture to a temperature of about 0° C. to precipitate p-nitraniline sulfate, and separating precipitated p-nitraniline sulfate from the remaining solution.

19. A method of producing p-nitraniline from a mixture of nitranilines including p-nitraniline which comprises separating p-nitraniline from the mixture by means of sulfuric acid.

20. A method of producing p-nitraniline from a mixture of nitranilines containing a major proportion of p-nitraniline which comprises treating the mixture with sulfuric acid of about 55 per cent. to about 75 per cent. strength, and separating p-nitraniline in the form of a sulfate from the resulting solution.

21. A method of producing p-nitraniline from a mixture of nitranilines including p-nitraniline which comprises separating p-nitraniline from the mixture by means of sulfuric acid of about 60 per cent. strength.

22. A method of producing p-nitraniline from a mixture of nitranilines containing a major proportion of p-nitraniline which comprises forming a solution of the mixture of nitranilines in sulfuric acid, adjusting the concentration of the acid to values within the ranges of about 55 per cent. to about 75 per cent. sulfuric acid and adjusting the temperature to about 0° C., to precipitate p-nitraniline sulfate, and separating precipitated p-nitraniline sulfate from the remaining solution.

LAWRENCE H. FLETT.